US012584856B2

(12) United States Patent
Kim et al.

(10) Patent No.: US 12,584,856 B2
(45) Date of Patent: Mar. 24, 2026

(54) DUST SENSOR

(71) Applicants: Gwanak Analog CO., LTD., Seoul (KR); Seoul National University R&DB Foundation, Seoul (KR)

(72) Inventors: Suhwan Kim, Seoul (KR); Hyunjoong Lee, Daejeon (KR); Hyunjong Kim, Seoul (KR)

(73) Assignees: Gwanak Analog CO., LTD., Seoul (KR); Seoul National University R&DB Foundation, Seoul (KR)

( * ) Notice: Subject to any disclaimer, the term of this patent is extended or adjusted under 35 U.S.C. 154(b) by 452 days.

(21) Appl. No.: 17/967,627

(22) Filed: Oct. 17, 2022

(65) Prior Publication Data

US 2023/0117076 A1     Apr. 20, 2023

(30) Foreign Application Priority Data

Oct. 19, 2021     (KR) ........................ 10-2021-0139720

(51) Int. Cl.
*G01N 21/47*          (2006.01)

(52) U.S. Cl.
CPC ..... *G01N 21/47* (2013.01); *G01N 2021/4733* (2013.01); *G01N 2201/123* (2013.01)

(58) Field of Classification Search
None
See application file for complete search history.

(56) References Cited

U.S. PATENT DOCUMENTS

| | | | | |
|---|---|---|---|---|
| 5,099,118 | A | * | 3/1992 | Francis ................ G01N 33/346 |
| | | | | 250/359.1 |
| 10,620,105 | B2 | | 4/2020 | Trainer |
| 2019/0257759 | A1 | * | 8/2019 | Han ................... G01N 21/6486 |
| 2019/0282098 | A1 | * | 9/2019 | Proud ...................... A61B 5/11 |
| 2020/0018683 | A1 | * | 1/2020 | Van Der Sluis ... G01N 15/1427 |
| 2020/0249143 | A1 | * | 8/2020 | Takeuchi ............... G01N 15/06 |
| 2020/0259314 | A1 | * | 8/2020 | Kearns ................... G02B 21/06 |
| 2022/0018754 | A1 | * | 1/2022 | Lychagov .......... G01N 15/0205 |

FOREIGN PATENT DOCUMENTS

| | | | |
|---|---|---|---|
| JP | 2015531062 | A | 10/2015 |
| JP | 201995413 | A | 6/2019 |
| JP | 2020514762 | A | 5/2020 |

(Continued)

OTHER PUBLICATIONS

Texas (PM2.5 and PM10 Particle Sensor Analog Front-End for Air Quality Monitoring Reference Design, TIDA-00378, Dec. 3, 2015, pp. 1-3, Texas Instruments. (https://www.ti.com/tool/TIDA-00378). (Year: 2015).*

(Continued)

*Primary Examiner* — Kara E. Geisel
*Assistant Examiner* — Chad Andrew Reverman
(74) *Attorney, Agent, or Firm* — WILLIAM PARK AND ASSOCIATES LTD.

(57) ABSTRACT

A dust sensor includes a photo detector configured to detect light scattered from dust; and a signal processing circuit having a high-pass filter receiving an electric signal generated from output of the photo detector. The signal processing circuit generates a dust detection signal using a signal provided to the high-pass filter as well as a signal output from the high-pass filter.

9 Claims, 9 Drawing Sheets

(56) References Cited

FOREIGN PATENT DOCUMENTS

| KR | 1020170071319 A | 6/2017 |
|----|-----------------|--------|
| KR | 101913973 B1 | 10/2018 |

OTHER PUBLICATIONS

Gustavo Martinez et al., PM2.5/PM10 Particle Sensor Analog Front-End for Air Quality Monitoring Design, TI Designs, May 11, 2016, pp. 1-44, Texas Instruments. (https://www.ti.com/lit/ug/tidub65c/tidub65c.pdf? s=1632968698891&).
PM2.5 and PM10 Particle Sensor Analog Front-End for Air Quality Monitoring Reference Design, TIDA-00378, Dec. 3, 2015, pp. 1-3, Texas Instruments. (https://www.ti.com/tool/TIDA-00378).

* cited by examiner

DUST SENSOR

CROSS-REFERENCE TO RELATED APPLICATIONS

This application claims priority under 35 U.S.C. § 119(a) to Korean Patent Application No. 10-2021-0139720, filed on Oct. 19, 2021, which is incorporated herein by reference in its entirety.

BACKGROUND

1. Technical Field

Various embodiments generally relate to a dust sensor, and more particularly, to a dust sensor capable of detecting dust using an optical sensing method.

2. Related Art

A dust sensor using light often includes a high-pass filter to remove noise caused by ambient light and offset of a diode.

FIG. 1 is a block diagram showing a conventional dust sensor.

The conventional dust sensor includes a light emitting diode 10, a driving circuit 11, a photo detector 20, a transimpedance amplifier (TIA) 21, a high-pass filter 30, an amplifier 40, an analog-to-digital converter (ADC) 50, and a digital signal processor (DSP) 60.

The light emitting diode 10 emits light into the air containing the dust 1 under the control of the driving circuit 11.

The photo detector 20 detects light scattered by the dust 1 and generates a current signal.

The TIA 21 converts the current signal output from the photo detector 20 into a voltage signal.

The high-pass filter 30 performs a filtering operation of passing a high-frequency band signal in the output of the TIA 21.

The amplifier 40 amplifies output of the high-pass filter 30, and the ADC 50 converts output of the amplifier 40 into a digital signal.

The DSP 60 analyzes output of the ADC 50 to measure density of the dust 1.

The conventional dust sensor is effective in removing offset and low-frequency noise by employing the high-pass filter 30.

However, when density of dust having a specific size increases, low frequency signal is generated, which is not distinguished from offset or low frequency noise and is also removed by the high-pass filter 30, which hinders accurate measurement of dust density.

FIG. 2 is a diagram illustrating a normal operation of a dust sensor.

The output of the TIA 21 includes an offset component and is temporarily increased in a section where dust is sensed.

The output of the high-pass filter 30 reflects output of the TIA 21 and temporarily increases in the section in which dust is detected, in which case the offset component, which is a low-frequency component, is removed.

The output of the amplifier 40 reflects amplification of the output of the high-pass filter 30.

FIG. 3 is a diagram illustrating an abnormal operation of the conventional dust sensor when relatively large dust particles are densely located.

The output of the TIA 21 includes an offset component and has an increased form in the section where dust particles are detected.

However, the output of the TIA 21 maintains a greatly increased state in the section in which densely located large-sized dust particles are detected, and then temporarily decreases in the section in which small-sized dust particle is detected.

The output of the high-pass filter 30 reflects high-pass filtering of the output of the TIA 21. A rising pulse is generated at the beginning of detection of the large-sized dust particles, and a falling pulse is generated when the small-sized dust particle is detected.

The output of the amplifier 40 reflects amplification of the output of the high-pass filter 30.

As shown in the diagram, since the signal in the section where the large-sized dust particles are continuously detected is lost by the operation of the high-pass filter 30, erroneous information is output as a result.

FIG. 4 is a diagram illustrating an abnormal operation of the conventional dust sensor when relatively small dust particles are densely located.

The output of the TIA 21 includes an offset component and has an increased form in the section where dust particles are detected.

However, the output of the TIA 21 maintains an increased state in a section in which small-sized dust particles are detected, and then temporarily increases further in a section in which a large-sized dust particle is detected.

The output of the high-pass filter 30 reflects high-pass filtering of the output of the TIA 21 and a pulse is generated at the beginning of detection of the small-sized dust particles, and a pulse is generated when a large-sized dust particle is detected.

The output of the amplifier 40 reflects amplification of the output of the high-pass filter 30.

As shown in the diagram, since the signal in the section where the small-sized dust particles are continuously detected is lost by the operation of the high-pass filter 30, erroneous information is output as a result.

As such, the conventional dust sensor has a problem in that sensing performance is deteriorated when dust of a specific size is concentrated.

SUMMARY

In accordance with the present teachings, a dust sensor may include a photo detector configured to detect light scattered from dust; and a signal processing circuit having a high-pass filter receiving an electric signal generated from output of the photo detector, wherein the signal processing circuit generates a dust detection signal using a signal provided to the high-pass filter as well as a signal output from the high-pass filter.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed novelty, and explain various principles and advantages of those embodiments.

DETAILED DESCRIPTION

The following detailed description references the accompanying figures in describing embodiments consistent with this disclosure. The examples of the embodiments are provided for illustrative purposes and are not exhaustive. Additional embodiments not explicitly illustrated or described are possible. Further, modifications can be made to presented embodiments within the scope of the present teachings. The detailed description is not meant to limit this disclosure. Rather, the scope of the present disclosure is defined only in accordance with the presented claims and equivalents thereof.

Hereinafter, embodiments of the present invention will be described with reference to the accompanying drawings.

Figure 5:
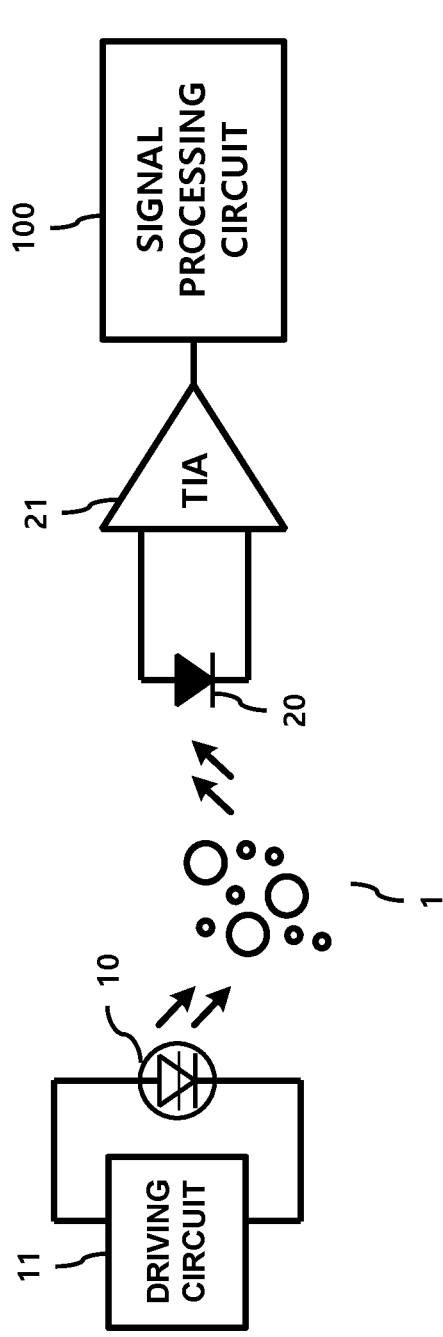
FIG. 5 is a block diagram illustrating a dust sensor according to an embodiment of the present disclosure.

FIG. 5 is a block diagram illustrating a dust sensor according to an embodiment of the present disclosure.

The dust sensor according to an embodiment of the present disclosure includes a light emitting diode 10, a driving circuit 11, a photo detector 20, a transimpedance amplifier (TIA) 21, and a signal processing circuit 100.

Since the light emitting diode 10, the driving circuit 11, the photo detector 20, and the TIA 21 are substantially the same as those of the conventional art, a detailed description thereof will be omitted.

In this embodiment, the signal processing circuit 100 detects the dust 1 in the air using the output of the TIA 21 to generate a dust detection signal.

The signal processing circuit 100 includes a high-pass filter and generates a dust detection signal using both a signal before passing through the high-pass filter and a signal after passing through the high-pass filter.

Figure 6:
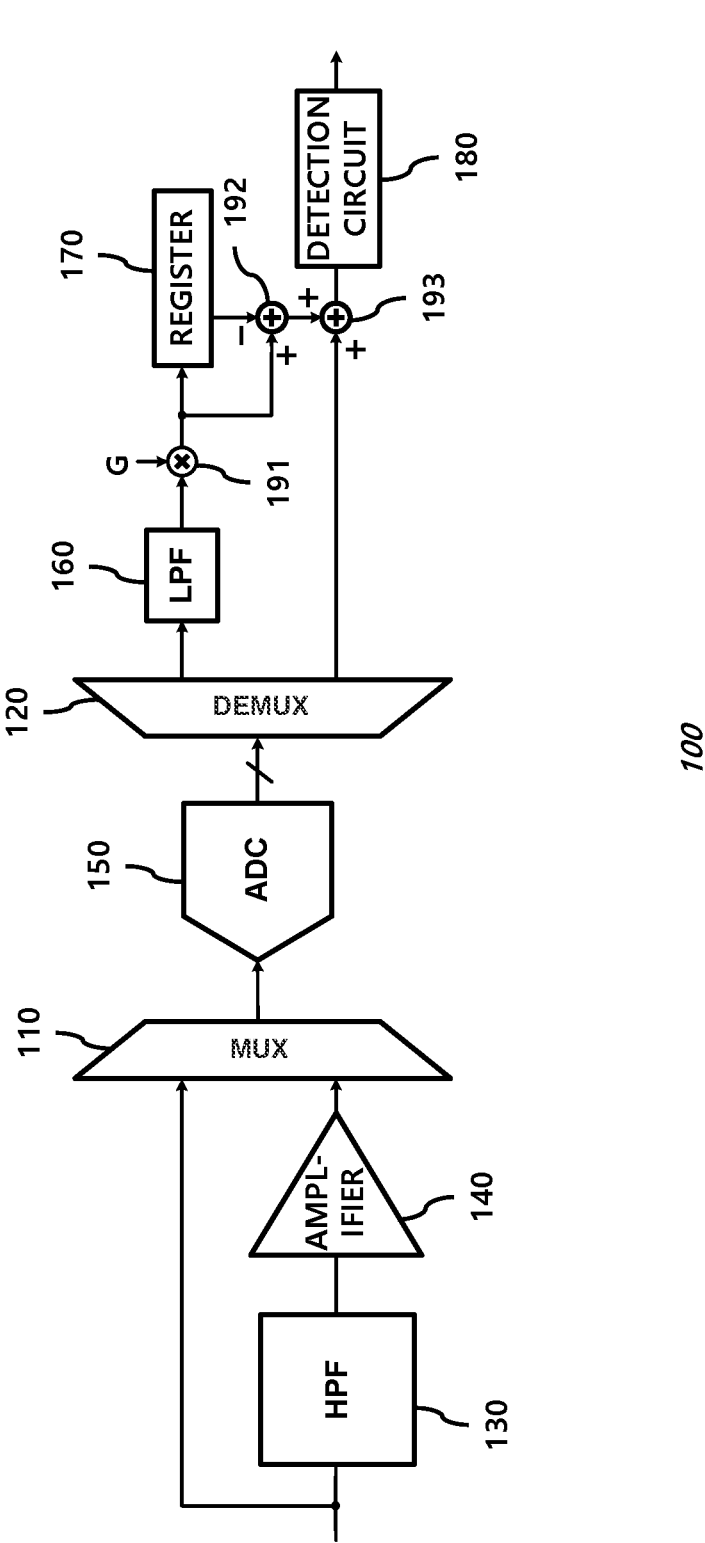
FIG. 6 is a block diagram illustrating a signal processing circuit according to an embodiment of the present disclosure.

FIG. 6 is a block diagram illustrating the signal processing circuit 100 according to an embodiment of the present disclosure.

The signal processing circuit 100 includes a mux 110, a demux 120, a high-pass filter 130, an amplifier 140, and an analog-to-digital converter (ADC) 150.

The signal processing circuit 100 further includes a low-pass filter 160, a register 170, a detection circuit 180, a first operator 191, a second operator 192, and a third operator 193.

Figure 1:
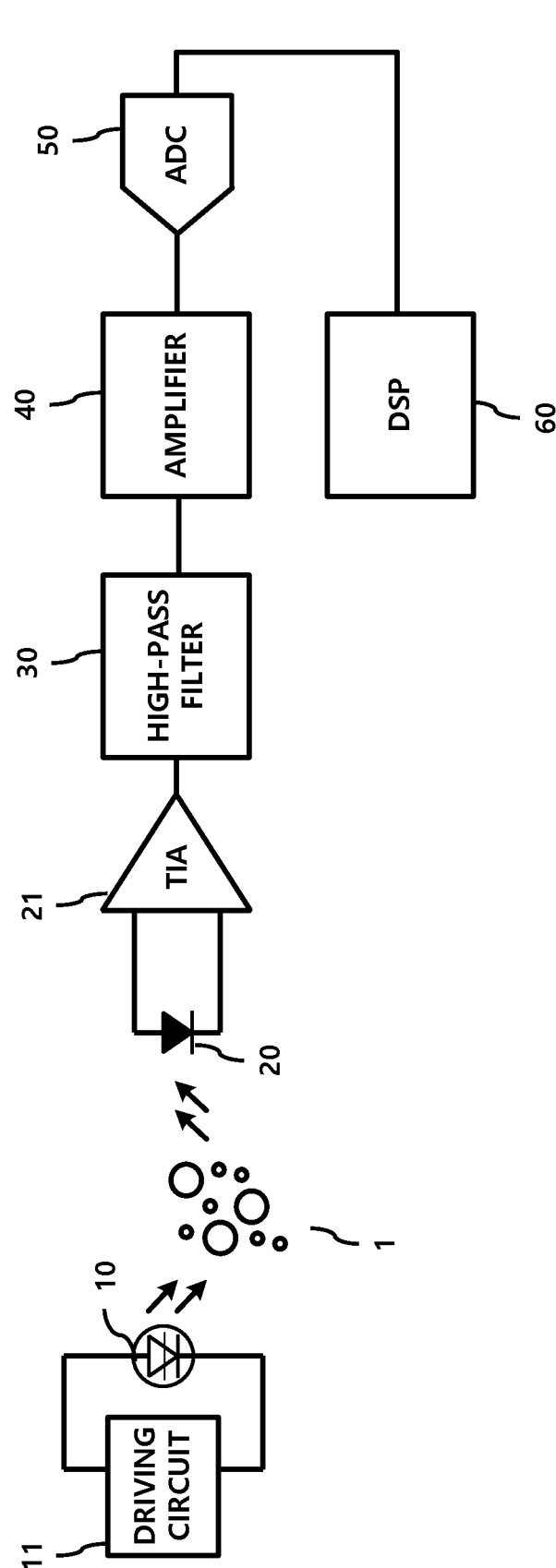
FIG. 1 is a block diagram illustrating a conventional dust sensor.

The high-pass filter 130, the amplifier 140, and the ADC 150 correspond to the high-pass filter 30, the amplifier 40, and the ADC 50 of the conventional dust sensor as shown in FIG. 1.

The mux 110 selectively outputs a signal input to the high-pass filter 130 or output of the amplifier 140, and the demux 120 provides output of the ADC 150 to the low-pass filter 160 or to the third operator 193.

In this embodiment, the output of the ADC 150 is a multi-bit digital signal.

The low-pass filter 160 performs a low-pass filtering operation as a digital filter.

The first operator 191 multiplies output of the low-pass filter 160 by a gain signal G and outputs a multiplication result.

At this time, the gain signal G corresponds to a gain of the amplifier 140.

The register 170 stores output of the first operator 191.

The second operator 192 subtracts a value stored in the register 170 from the output of the first operator 191.

The third operator 193 adds output of the demux 120 and output of the second operator 192.

The detection circuit 180 generates a dust detection signal from the output of the third operator 193.

As described above, the signal processing circuit 100 generates a dust detection signal using a signal before being input to the high-pass filter 130 and a signal after passing through the high-pass filter 130.

Figure 7:
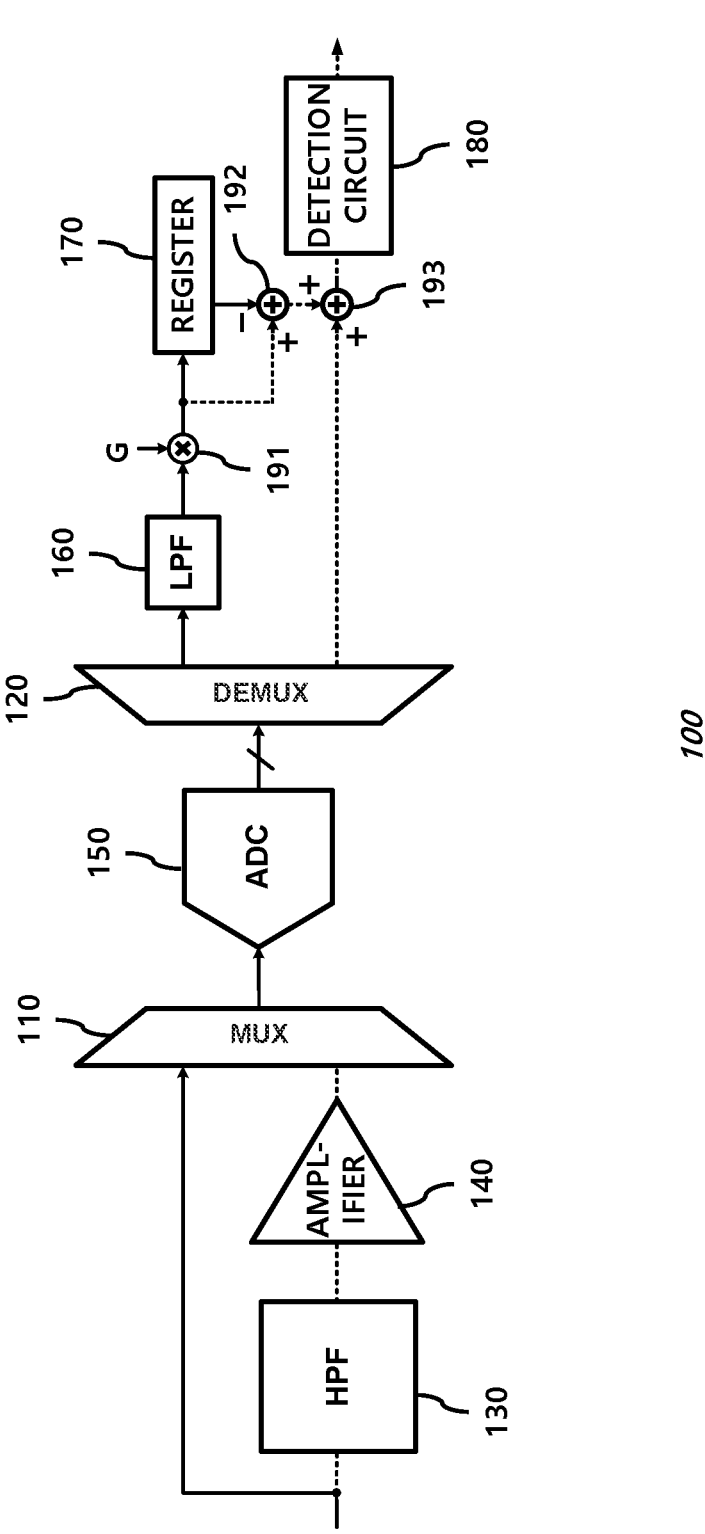
FIGS. 7, 8, and 9 are block diagrams illustrating an operation of a dust sensor according to an embodiment of the present disclosure.
Figure 8:
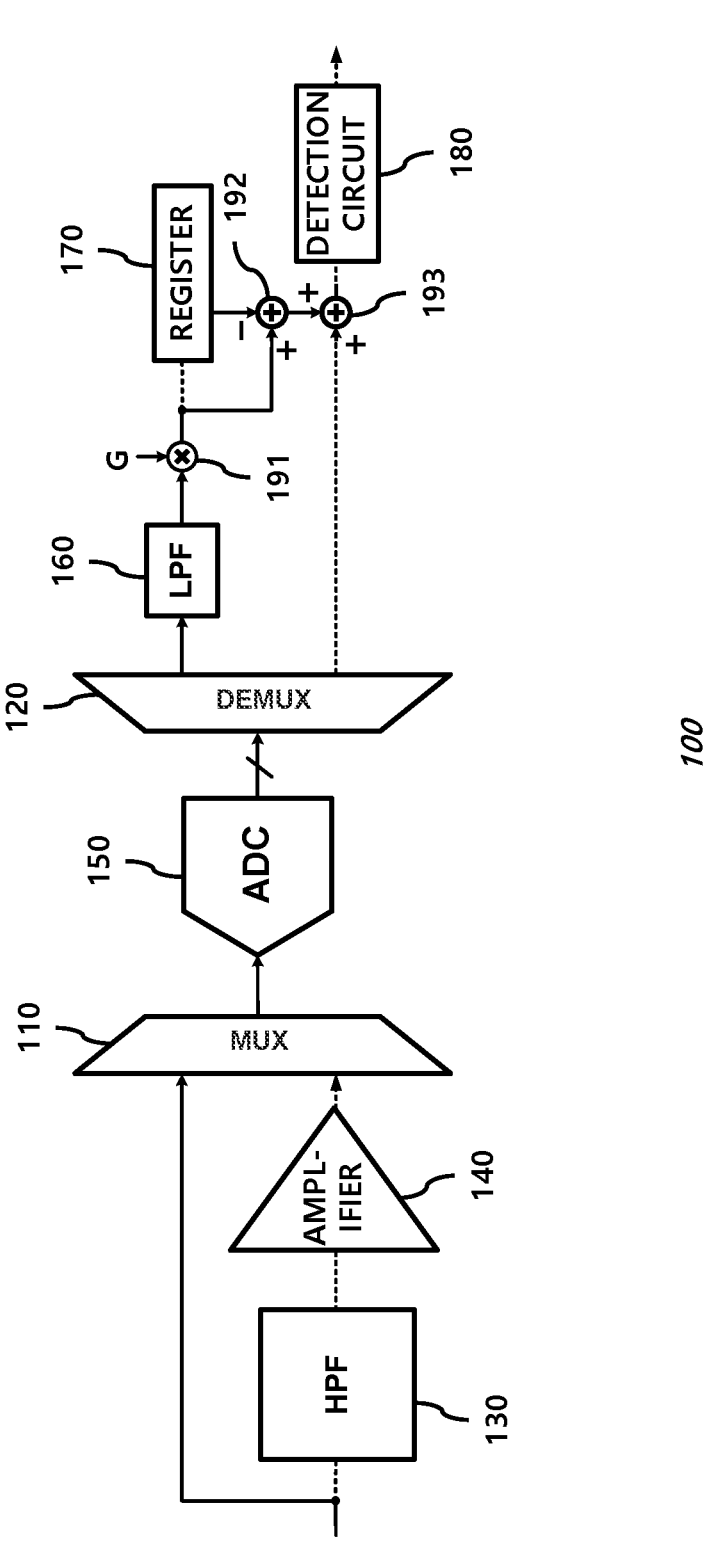
Figure 9:
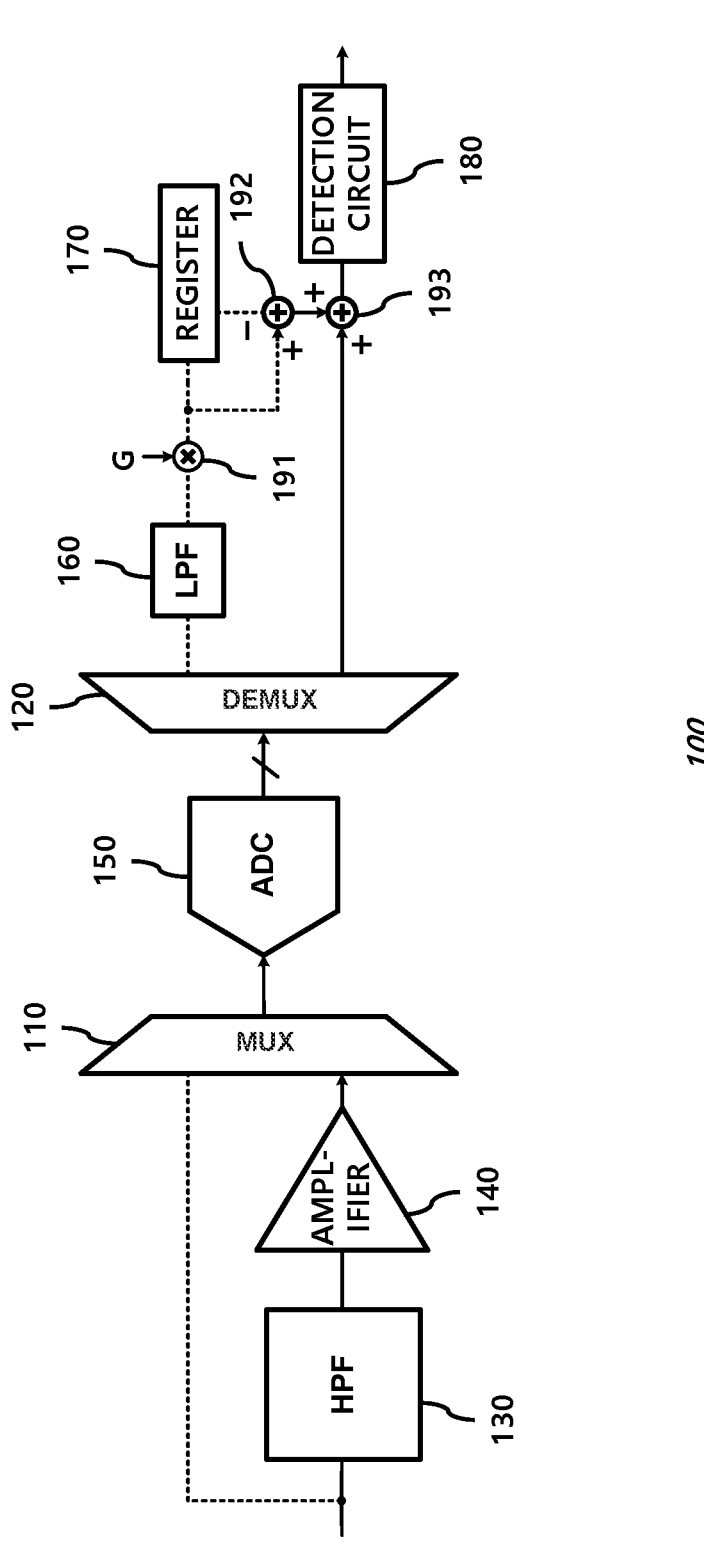

FIGS. 7 to 9 are block diagrams for explaining the operation of the signal processing circuit 100.

In the drawing, a dotted line indicates a signal that is not used, and a solid line indicates a signal that is used.

First, an operation shown in FIG. 7 is performed, which is performed in the absence of dust.

The output of the TIA 21 is provided to the ADC 150 through the mux 110 as a signal before passing through the high-pass filter 130.

The multi-bit digital signal output from the ADC 150 is provided to the low-pass filter 160 through the demux 120.

The first operator 191 multiplies the output of the low-pass filter 160 by the gain signal G and the register 170 stores multiplication result.

Since the operation in FIG. 7 is performed in a dust-free state, the multiplication result stored in the register 170 corresponds to total of low-frequency components including noise and offset.

Hereinafter, the multiplication result stored in the register 170 is referred to as an offset signal.

Operations shown in FIGS. 8 and 9 are performed in the presence of dust.

First, the operation shown in FIG. 8 is performed.

As shown in FIG. 8, the output of the TIA 21 is provided to the ADC 150 through the mux 110 as a signal before passing through the high-pass filter 130.

The multi-bit digital signal output from the ADC 150 is provided to the low-pass filter 160 through the demux 120.

The first operator 191 multiplies the output of the low-pass filter 160 by the gain signal G and outputs corresponding multiplication result.

The second operator 192 outputs a value obtained by subtracting the output of the register 170 from the output of the first operator 191.

Since the value stored in the register 170 is the offset signal, the output of the second operator 192 corresponds to a signal obtained by removing the offset signal from the low-frequency signal measured in the presence of dust.

Figure 3:
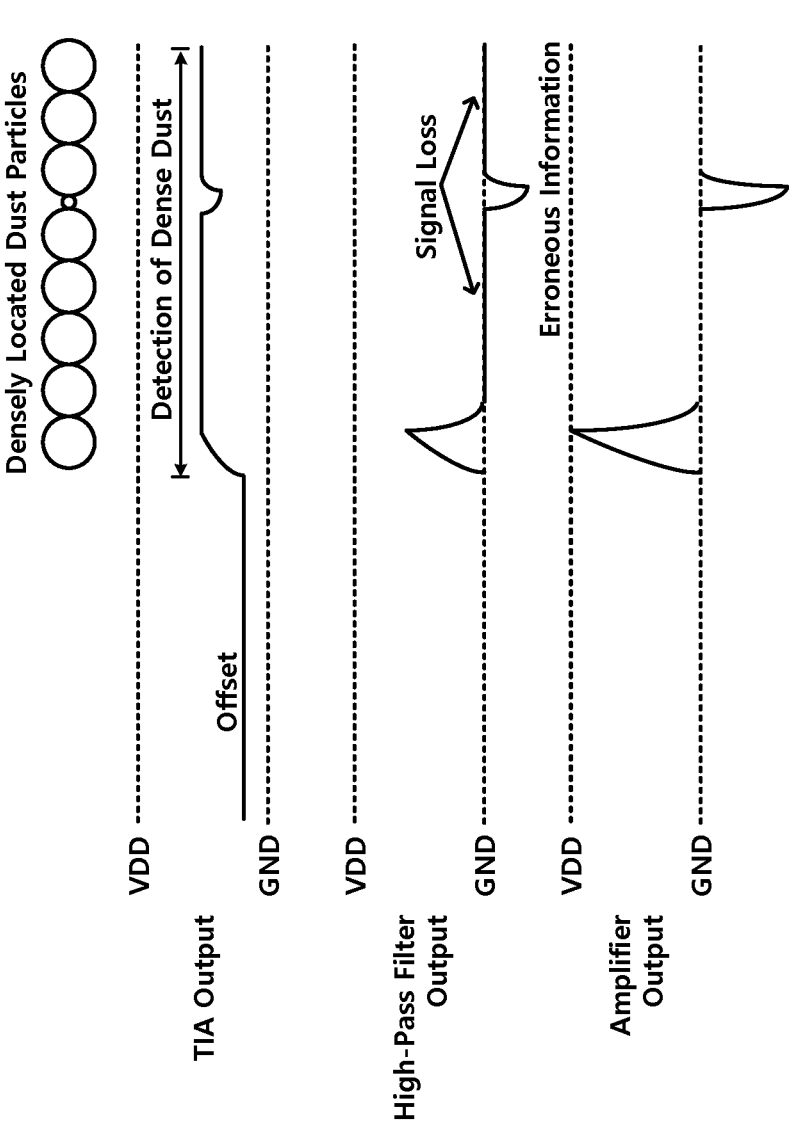
FIGS. 3, and 4 are diagrams illustrating a problem of a conventional dust sensor.
Figure 4:
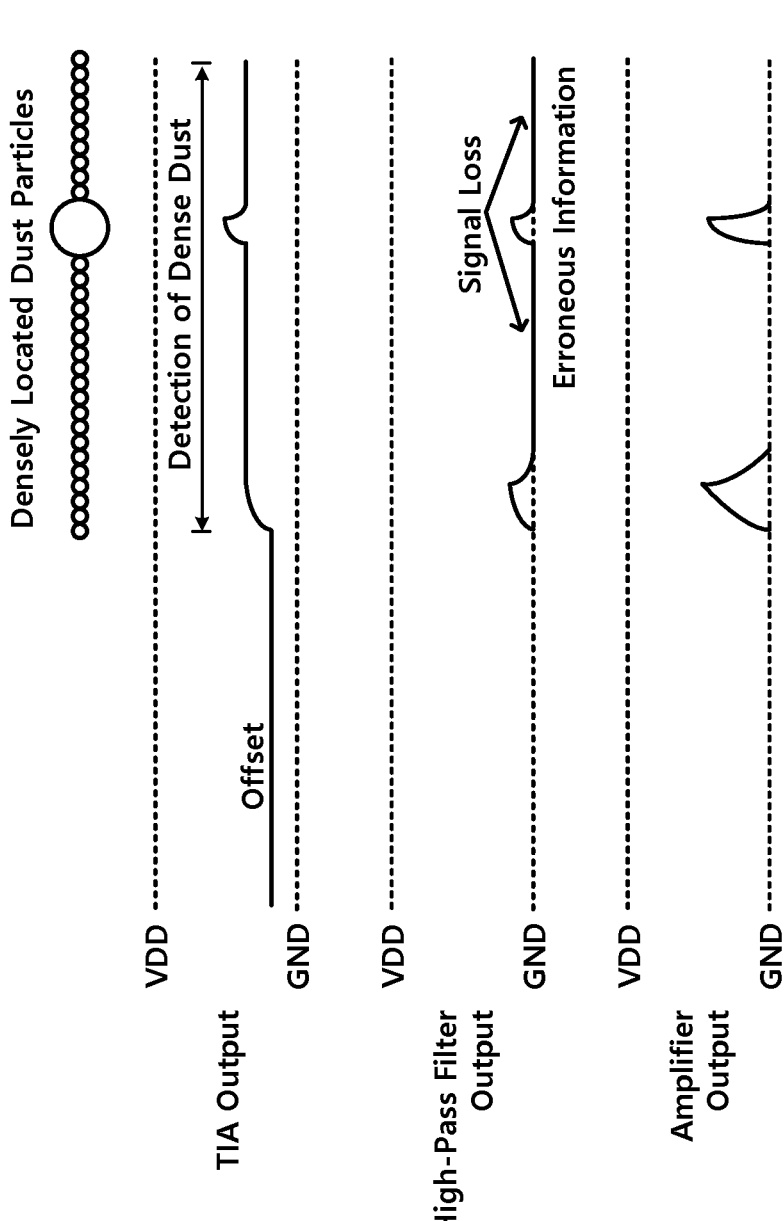

Referring to FIGS. 3 and 4, the low-frequency signal measured in the presence of dust corresponds to high-density dust information.

In this embodiment, the second operator 192 holds the subtraction result.

The low-pass filter 160, the first operator 191, the register 170, and the second operator 192 are circuits for generating high-density dust information and may be referred to as a high-density dust information generating circuit.

Next, the operation shown in FIG. 9 is performed.

In FIG. 9, the output of the TIA 21 passes through the high-pass filter 130, the amplifier 140, and the ADC 150 as in the prior art and output of the ADC 150 includes high-frequency component.

Figure 2:
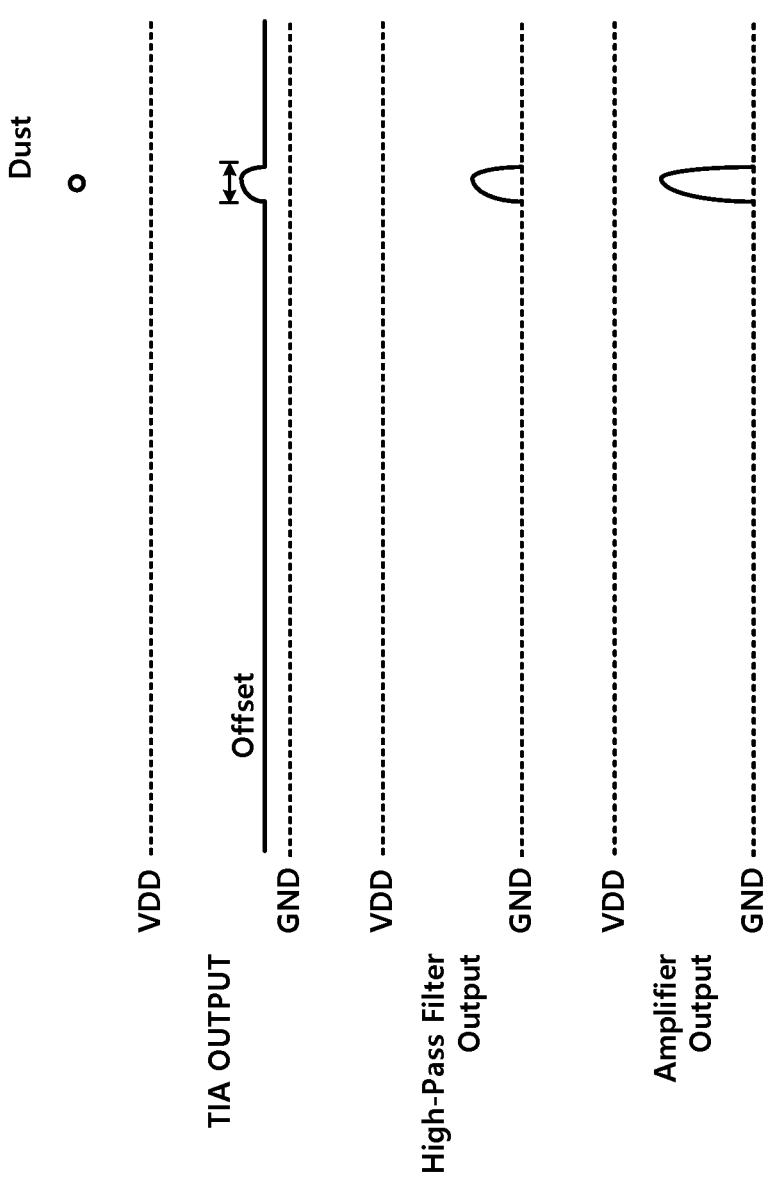
FIG. 2 is a diagram illustrating a normal operation of a dust sensor.

Referring to FIGS. 2 and 3, high-frequency component measured in the presence of dust correspond to low-density dust information.

The third operator 193 adds the output of the second operator 192 and the output of the demux 120. Because the output of the second operator 192 is a low-frequency signal due to the dust and the output of the demux 120 is a high-frequency signal due to the dust, the output of the third operator 193 includes both low-frequency and high-frequency components generated by the dust.

The detection circuit 180 generates the dust detection signal from the output of the third operator 193.

The detection circuit 180 may classify size of the dust and density of the dust based on the size of the dust using magnitude, direction of change, and duration of a signal provided from the third operator 193.

Since the operation itself of the detection circuit 180 can be easily understood by a person skilled in the art from conventional techniques such as ⌈TI Designs PM2.5/PM10 Particle Sensor Analog Front-End for Air Quality Monitoring Design, TIDUB65C-December 2015-Revised May 2016, https://www.ti.com/lit/ug/tidu265c/tidub65c.pdf?s=1632968698891⌋, a detailed description thereof will be omitted.

Since the third operator 193 and the detection circuit 180 generate the dust detection signal for all dust information, they may be referred to as a dust detection signal generating circuit.

The dust sensor according to present disclosure may accurately detect dust density by removing the low-frequency noise caused by offset of the amplifier or ambient light and may accurately detect density of dust in an environment where dust of a specific size is densely present.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. A dust sensor comprising:
   a photo detector configured to detect light scattered from dust; and
   a signal processing circuit including a high-pass filter receiving an electric signal generated from output of the photo detector,
   wherein the signal processing circuit generates a dust detection signal using a signal provided to the high-pass filter as well as a signal output from the high-pass filter,
   wherein the signal processing circuit generates an offset signal in a dust-free state,
   generates a signal corresponding to high density dust using the signal provided to the high-pass filter and the offset signal, and generates a signal corresponding to low density dust using output of the high-pass filter, wherein the signal corresponding to high density dust and the signal corresponding to low density dust are based on a size of the dust using magnitude, direction of change, or duration of the signal corresponding to high density dust and the signal corresponding to low density dust.

2. The dust sensor of claim 1, further comprising a transimpedance amplifier configured to generate the electric signal by transforming output of the photo detector into a voltage signal.

3. The dust sensor of claim 1, where in the signal processing circuit further includes:
   an amplifier configured to amplify output of the high-pass filter;
   an analog-to-digital converter (ADC) configured to convert the electric signal or output of the amplifier into a digital signal;
   a high density dust information generating circuit configured to generate high density dust information from output of the ADC; and
   a dust detection signal generating circuit configured to generate the dust detection signal corresponding to whole dust information from output of the ADC and the high density dust information.

4. The dust sensor of claim 3, further comprising a mux configured to provide the electric signal or output of the amplifier to the ADC.

5. The dust sensor of claim 3, further comprising a demux configured to provide output of the ADC to the high density dust information generating circuit or the dust detection signal generating circuit.

6. The dust sensor of claim 3, wherein the high density dust information generating circuit includes:
   a low-pass filter configured to filter output of the ADC;
   a first operation configured to multiply output of the low-pass filter by a gain signal;
   a register configured to store output of the first operator; and
   a second operator configured to subtract a value stored in the register from output of the first operator.

7. The dust sensor of claim 6, wherein the high density dust information generating circuit stores output of the first operator in the register in a dust-free state, and provides output of the second operator as the high density dust information in a dusty state.

8. The dust sensor of claim 3, wherein the dust detection signal generating circuit includes a third operator configured to add output of the ADC and output of the high density dust information generating circuit.

9. The dust sensor of claim 8, wherein the dust detection signal generating circuit further includes a detection circuit configured to generate the dust detection signal from output of the third operator.

* * * * *